United States Patent
Chen et al.

(10) Patent No.: US 7,507,693 B2
(45) Date of Patent: Mar. 24, 2009

(54) VISCOELASTIC SURFACTANT FLUID SYSTEMS COMPRISING AN AROMATIC SULFONATE AND METHODS OF USING SAME

(75) Inventors: Yiyan Chen, Richmond, TX (US); Jesse C. Lee, Paris (FR); Eric Hanson, San Diego, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 60 days.

(21) Appl. No.: 11/608,085

(22) Filed: Dec. 7, 2006

(65) Prior Publication Data

US 2008/0139410 A1   Jun. 12, 2008

(51) Int. Cl.
 C09K 8/60 (2006.01)
 C09K 8/62 (2006.01)
 E21B 43/26 (2006.01)
(52) U.S. Cl. ............... 507/207; 507/204; 507/240; 507/256; 507/259; 507/265; 507/267; 166/308.2
(58) Field of Classification Search ................. 507/207
 See application file for complete search history.

(56) References Cited

U.S. PATENT DOCUMENTS

| | | | | |
|---|---|---|---|---|
| 3,302,711 A * | 2/1967 | Dilgren | .................... | 166/270.2 |
| 3,880,764 A * | 4/1975 | Donham | .................... | 507/119 |
| 4,019,995 A * | 4/1977 | Briggs et al. | ............. | 252/62.53 |
| 4,219,082 A | 8/1980 | Kalfoglou | | |
| 4,341,645 A * | 7/1982 | Blattel et al. | ................ | 507/109 |
| 4,664,818 A * | 5/1987 | Halliday et al. | ............. | 507/113 |
| 4,836,285 A * | 6/1989 | Navratil et al. | ............. | 166/295 |
| 5,134,118 A * | 7/1992 | Patel et al. | ................. | 507/121 |
| 5,228,524 A * | 7/1993 | Johnson et al. | ............... | 175/72 |
| 5,486,312 A * | 1/1996 | Sandiford et al. | ........... | 516/102 |
| 5,979,557 A | 11/1999 | Card | | |
| 6,221,827 B1 * | 4/2001 | Mendoza Cruz et al. | ..... | 510/380 |
| 6,258,859 B1 | 7/2001 | Dahayanake | | |
| 6,435,277 B1 | 8/2002 | Qu | | |
| 6,450,260 B1 * | 9/2002 | James et al. | ................. | 166/277 |
| 6,605,570 B2 * | 8/2003 | Miller et al. | ................. | 507/211 |
| 6,637,517 B2 * | 10/2003 | Samuel et al. | .............. | 166/381 |
| 6,703,352 B2 | 3/2004 | Dahayanake | | |
| 6,828,280 B2 * | 12/2004 | England et al. | ............. | 507/202 |
| 6,840,318 B2 * | 1/2005 | Lee et al. | ..................... | 166/293 |
| 7,084,095 B2 * | 8/2006 | Lee et al. | ..................... | 507/261 |
| 7,268,100 B2 * | 9/2007 | Kippie et al. | ............... | 507/131 |

(Continued)

FOREIGN PATENT DOCUMENTS

WO   WO 9856497 A1 *  12/1998

*Primary Examiner*—Randy Gulakowski
*Assistant Examiner*—John J Figueroa
(74) *Attorney, Agent, or Firm*—Thomas O. Mitchell; David Cate; Robin Nava (57) ABSTRACT

Methods of improving shear recovery time of viscoelastic surfactant fluid systems are described, one method involving providing a viscoelastic surfactant fluid system comprising a major portion of a surfactant and a rheology enhancer in a concentration sufficient to shorten shear recovery time of the fluid system compared to shear recovery time of the fluid system absent the rheology enhancer, the rheology enhancer selected from aromatic sulfonates having a molecular weight of at least 500; and injecting the fluid system down a well. The rheology enhancer may be a lignosulfonate derived from wood pulping. Viscoelastic surfactant systems including the rheology enhancer are also described.

17 Claims, 3 Drawing Sheets

U.S. PATENT DOCUMENTS

| | | |
|---|---|---|
| 7,275,596 B2 * | 10/2007 | Willberg et al. .......... 166/280.1 |
| 7,318,474 B2 * | 1/2008 | Welton et al. ............ 166/280.1 |
| 7,398,826 B2 * | 7/2008 | Hoefer et al. ............ 166/280.1 |
| 2003/0134751 A1 | 7/2003 | Lee |
| 2006/0111248 A1 | 5/2006 | Lee |
| 2006/0128597 A1 | 6/2006 | Chen |
| 2006/0128598 A1 | 6/2006 | Chen |
| 2006/0194700 A1 * | 8/2006 | Gatlin et al. ................ 507/140 |

* cited by examiner

VISCOELASTIC SURFACTANT FLUID SYSTEMS COMPRISING AN AROMATIC SULFONATE AND METHODS OF USING SAME

BACKGROUND OF THE INVENTION

1. Field of Invention

The invention relates to rheology enhancers for viscoelastic surfactant fluid systems (VES's). More particularly it relates to selection and optimization of rheology enhancers for fluid systems to be used over broad ranges of salinity and temperature. Most particularly it relates to rheology enhancers to shorten shear recovery times and increase the viscosity of VES's for use in oilfield treatment fluids.

2. Related Art

Certain surfactants, when in aqueous solution, form viscoelastic fluids. Such surfactants are termed "viscoelastic surfactants", or "VES's". Other components, such as additional VES's, co-surfactants, buffers, acids, solvents, and salts, are optional or necessary and perform such functions as increasing the stability (especially thermal stability) or increasing the viscosity of the systems by modifying and/or stabilizing the micelles; all the components together are called a viscoelastic surfactant system. Not to be limited by theory, but many viscoelastic surfactant systems form long rod-like or worm-like micelles in aqueous solution. Entanglement of these micelle structures gives viscosity and elasticity to the fluid. For a fluid to have good viscosity and elasticity under given conditions, proper micelles must be formed and proper entanglement is needed. This requires the surfactant's structure to satisfy certain geometric requirements and the micelles to have sufficient length or interconnections for adequate entanglements.

Many chemical additives are known to improve the rheological behavior (greater viscosity and/or greater stability and/or greater brine tolerance and/or lower shear sensitivity and/or faster rehealing if micelles are disrupted, for example by shear). Such materials are typically called co-surfactants, rheology modifiers, or rheology enhancers, etc., and typically are alcohols, organic acids such as carboxylic acids and sulfonic acids, sulfonates, and others. We shall use the term rheology enhancers here. Such materials often have different effects, depending upon their exact composition and concentration, relative to the exact surfactant composition (for example hydrocarbon chain lengths of groups in the surfactant and co-surfactant) and concentration. For example, such materials may be beneficial at some concentrations and harmful (lower viscosity, reduced stability, greater shear sensitivity, longer rehealing times) at others. A particular problem is that at low surfactant concentrations, many VES fluid systems exhibit long shear recovery times. It would be advantageous to use as little VES fluid system as possible to achieve significant shear recovery and viscosity increase.

In particular, many VES fluid systems exhibit long viscosity recovery times after experiencing prolonged high shear. Slow recovery negatively impacts drag reduction and proppant transport capability, which consequently leads to undesirably high treating pressures and risks of near wellbore screen-outs. Although additives are known that can shorten VES shear recovery times and increase viscosities, there is a need for additional simple, inexpensive rheology enhancers, in particular those that shorten VES shear recovery times and increase viscosities at relatively low concentrations of the VES fluid system.

SUMMARY OF THE INVENTION

In accordance with the present invention, VES fluid systems and methods of decreasing VES shear recovery times and increasing viscosity of well treatment fluids are presented, which methods may also enhance rheology for downhole oilfield treatment fluids. One embodiment is an oilfield treatment method consisting of preparing and injecting down a well a VES fluid system comprising a viscoelastic surfactant or mixture of surfactants selected from cationic, anionic, zwitterionic, and amphoteric surfactants, and a rheology enhancer in a concentration sufficient to shorten the shear recovery time of the fluid, particularly at lower concentrations of the VES fluid system, in which the rheology enhancer is a high-molecular weight aromatic sulfonate, in particular those aromatic sulfonates derived from wood pulping operations (as explained further herein). These sulfonates may have molecular weight of at least 500, and in certain embodiments up to 100,000 or more, and may be referred to herein as high-molecular weight aromatic sulfonates, to distinguish them from relatively low molecular weight aromatic sulfonates, such as sodium dodecylbenzene sulfonate (SDBS). VES fluid systems of the invention may comprise other ingredients, such as co-surfactants (for example the mentioned SDBS) and other rheology enhancers known in the art (such as partially hydrolyzed polyvinyl esters and partially hydrolyzed polyacrylates). The inventive rheology enhancers described herein may also increase the viscosity of the fluid.

The viscoelastic surfactant system may contain a cationic surfactant, for example a surfactant or mixture of surfactants having the structure:

$$R_1N^+(R_2)(R_3)(R_4)X^-$$

in which $R_1$ has from about 14 to about 26 carbon atoms and may be branched or straight chained, aromatic, saturated or unsaturated, and may comprise a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion; and mixtures of these compounds. As a further example, $R_1$ may comprise from about 18 to about 22 carbon atoms and may comprise a carbonyl, an amide, or an amine; $R_2$, $R_3$, and $R_4$ may comprise from 1 to about 3 carbon atoms, and $X^-$ is a halide. As a further example, $R_1$ may comprise from about 18 to about 22 carbon atoms and may comprise a carbonyl, an amide, or an amine, and $R_2$, $R_3$, and $R_4$ are the same as one another and comprise from 1 to about 3 carbon atoms. Cationic viscoelastic surfactant systems may optionally comprise amines, alcohols, glycols, organic salts, chelating agents, solvents, mutual solvents, organic acids, organic acid salts, inorganic salts, oligomers, polymers, co-polymers, and mixtures of these materials, present at a concentration of between about 0.01 and about 10 percent, for example at a concentration of between about 0.01 and about 1 percent. The amphoteric surfactant may be, for example, an amine oxide.

The inventive aromatic sulfonate rheology enhancer may be present in the VES fluid systems of the invention at a concentration ranging from about 0.0005% to about 0.2%, for example at a concentration of from about 0.001% to about 0.05%.

By the term "aromatic sulfonate" is meant that the VES fluid systems of the invention comprise rheology enhancers that are primarily aromatic (arene) in structure; however, the term is not meant to rule out aromatic sulfonates that have an intramolecular alkyl (aliphatic) moiety, or sulfonate rheology enhancers that comprise an aromatic sulfonate compound mixed with another compound that may not be sulfonated or aromatic in structure. Furthermore, the term is meant to include: molecules in which the sulfur atom is bonded directly with a carbon atom in an aromatic ring; molecules in which the sulfur atom is bonded to a carbon atom that itself is not a member of an aromatic ring; and molecules having both of these structures.

In certain embodiments of compositions and methods of the invention, the inventive rheology enhancers may be selected from lignosulfonates, or sulfonated lignin, which are water-soluble anionic polyelectrolyte polymer byproducts of the Kraft process and sulfite process for production of wood pulp. To make pulp and paper, various processes are used to release the cellulose, by removing the lignin from plant cells, by destroying the chemical bonds within the lignin. These processes produce by-products which are different in composition from the original lignin polymer. In one such process lignin reacts with sulfur dioxide to form lignosulfonic acid. Lignosulfonates can also be produced as the sodium, potassium, calcium, magnesium, zinc, or other metallic sulfonate salts, or ammonium salts. Using other chemical processes, lignosulfonate chemicals that have been oxidized or ethoxylated can be manufactured. As used herein, the term "lignosulfonate" is intended to include one or more of these variations, and functional equivalents thereof. Chemically, they may be described as sulfonated lignins or lignin sulfonates. Lignosulfonates may be present in conjunction with a co-rheology enhancer such as an aromatic acid.

The fluid further may optionally contain an acid selected from hydrochloric acid, hydrofluoric acid, formic acid, acetic acid, lactic acid, glycolic acid, sulfamic acid, malic acid, citric acid, tartaric acid, maleic acid, methylsulfamic acid, chloroacetic acid, and mixtures of these acids.

Another embodiment is a method of shortening the shear recovery time of a viscoelastic surfactant based fluid comprising a viscoelastic surfactant or mixture of surfactants selected from cationic, anionic, zwitterionic, and amphoteric surfactants, comprising adding an inventive rheology enhancer described herein in a concentration sufficient to shorten the shear recovery time of the VES fluid system.

Yet another aspect of the invention are compositions comprising a viscoelastic surfactant fluid comprising a viscoelastic surfactant or mixture of surfactants selected from cationic, anionic, zwitterionic, and amphoteric surfactants, comprising an inventive rheology enhancer described herein in a concentration sufficient to shorten the shear recovery time of the VES fluid system.

Methods and compositions of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics may be obtained is explained in the following description and attached drawings in which.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

When fluids are viscosified by the addition of viscoelastic surfactant systems, the viscosity increase is believed to be due to the formation of micelles, for example worm-like micelles, which entangle to give structure to the fluid that leads to the viscosity. In addition to the viscosity itself, an important aspect of a fluid's properties is the degree and rate of viscosity-recovery or re-healing when the fluid is subjected to high shear and the shear is then reduced. For VES fluids, shear may disrupt the micelle structure, after which the structure reforms. Controlling the degree and rate of reassembling (re-healing) is necessary to maximize performance of the surfactant system for different applications. For example, in hydraulic fracturing it is critical for the fluid to regain viscosity as quickly as possible after exiting the high-shear region in the tubulars and entering the low-shear environment in the hydraulic fracture. On the other hand, it is beneficial in coiled tubing cleanouts to impart a slight delay in regaining full viscosity in order to "jet" the solids more efficiently from the bottom of the wellbore into the annulus. Once in the annulus the regained viscosity ensures that the solids are effectively transported to the surface.

Although viscoelastic surfactant fluid systems have been shown to have excellent rheological properties for hydraulic fracturing applications, shear recovery time, not fluid viscosity, often dictates the minimum concentration of surfactant required. For example, a fluid made with a certain concentration of surfactant may show adequate viscosity for fracturing at a given temperature, but the minimum usable concentration may be higher due to slow shear recovery with the lower concentration. An acceptable shear recovery time is considered to be about 15 seconds. A time longer than about 15 seconds will negatively impact drag reduction and proppant transport. Shortening the viscosity-recovery time makes it possible to use VES fluid systems that would otherwise not be suitable in many applications. In addition, when a rheology modifier also increases fluid viscosity, then less surfactant is needed to provide a given viscosity. Examples of known rheology enhancers are given in U.S. Patent Application Publication Nos. 2006-0111248, and 2006-0128597, which are assigned to the same assignee as the present invention and which are hereby incorporated in their entirety.

We have found that high-molecular weight aromatic sulfonates, particularly those derived from wood pulping operations, or equivalent operations, when included in certain viscoelastic surfactant fluid systems, in the proper concentration relative to the surfactant active ingredient and other optional ingredient(s), significantly shorten the shear recovery time of the systems, increasing the viscosity, except at high temperatures, at the same time. In many cases, the shear recovery is nearly instantaneous. We will refer to these high-molecular weight aromatic sulfonates as "rheology enhancers" herein. The inventive rheology enhancers extend the conditions under which the VES systems can be used, and reduce the amount of surfactant needed, which in turn reduces the cost and improves clean-up. We have found that the inventive rheology enhancers are effective for shortening the rehealing time after high shear, and increasing the viscosity of VES systems at a given temperature, making the fluids more useful for many purposes, such as, but not limited to, uses as oilfield treatment fluids, especially stimulation fluids, most especially hydraulic fracturing fluids. Suitable concentrations (weight % in the final fluid system) are from about 0.0005% to about 0.2%, for example from about 0.001% to about 0.05%. These are very low concentrations for rheology enhancers. (It should be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

As noted previously, one class of high-molecular weight aromatic sulfonates found useful in the practice of the invention are those derived from wood pulping operations, commonly referred to as lignosulfonates. See, for example, Hawley's Condensed Chemical Dictionary, 12$^{th}$ Ed., pages 698-699. Lignosulfonates, as described in U.S. Pat. No. 4,219,082 (incorporated by reference herein for its description of lignosulfonates) are anionic polyelectrolytes that are soluble in water and that tolerate hard water (polyvalent ions, e.g. calcium and magnesium). They are also thermally stable in formations where the temperature is high. Lignosulfonates are macro-molecules built up by complex condensation of phenyl propane units. The sulfonate groups are attached to the aliphatic side chains, mainly to the alpha carbons. Lignosulfonates are water soluble, with molecular weights ranging from several thousand to around 50,000 or more. They are economically attractive since being by-products of the pulping industry, they are plentiful and cost less than either the surfactants or the polymers used in enhanced oil recovery methods. The polyelectrolyte lignosulfonates with strongly ionized sulfonate groups are negatively charged species and have a tendency to adsorb on solid surfaces thereby imparting a negative charge to them. The rock surfaces of a reservoir treated with lignosulfonate will be inert towards the anionic surfactants in the flood water used in surfactant flooding, and therefore loss of surfactants to the rock surfaces will be kept to a minimum. The same phenomenon will occur with polymer thickened drive fluid. Lignin is second only to cellulose as the principal constituent in wood.

Generally, lignin is a complex phenolic polyether containing many different functional groups including carboxyls, carbonyls, and alcoholic and phenolic hydroxyls. Lignins and their derivatives are described in KirK-Othmer Encyclopedia of Chemical Technology, Second Edition, Vol. 12, beginning at page 362. This publication describes two very broad classes of lignin derivatives: sulfite lignins and alkali lignins. The difference in the lignins exists because of the method of extraction of lignin material from woody materials.

Sulfonated alkali lignins are readily available commercially from various sources including but not limited to West Virginia Pulp and Paper Company under the trade name REAX. Their general method of preparation is described in the Encyclopedia of Chemical Technology referred to above. Briefly, sulfonated alkali lignins are prepared by cooking woodchips with a 10% solution of a mixture of sodium hydroxide with about 20 mole percent of sodium sulfide. The lignin with wood is modified into a sodium compound often termed sodium lignate or alkali lignin which is very soluble in the strongly alkaline solution. These alkali lignins are removed from solution by lowering the pH which precipitates out the alkali lignins. These unsulfonated alkali lignins are sold under various tradenames including INDULIN (Mead-Westvaco, Glen Allen, Va., U.S.A.). These alkali lignins are used to prepare the sulfonated derivatives. Methods of sulfonation are known by those skilled in the art. One typical method involves treating the alkali lignins with a solution of alkali sulfites at elevated temperature and pressure. The degree of sulfonation may be controlled to provide a variety of sulfonated alkali lignins.

The other main type of lignin derivatives are called sulfite lignins or sulfite lignosulfonates. Sulfite lignins are generally made by cooking woodchips under pressure in a solution of sulfurous acid and calcium, magnesium, sodium or ammonium bisulfite. This process converts insoluble lignins to soluble lignosulfonic acid. The lignosulfonic acids or calcium, magnesium, sodium or ammonium salts of the lignosulfonic acids are available under various tradenames including MARASPERSE (Borregaard LignoTech, Rothschild, Wis., U.S.A.) LIGNOSITE (Bisley & Co Pty Ltd, Syndey, Australia), ORZAN (Crown Zellerback Corp., San Francisco Calif., U.S.A.), TORANIL (Wassau Paper, Mosinee, Wis. U.S.A.), and RAYFLO.

The broad term "lignosulfonate" used herein refers to sulfonated alkali lignins and to sulfite lignosulfonates (sulfite lignins) derived from wood pulping operations. These are distinct types of compounds as explained above. Since the alkali lignins require sulfonation after extraction of the material from woody products, it is also proper to call them sulfonated alkali lignins. Likewise, since sulfite lignins emerge from the extraction process already sulfonated it is also proper to refer to this class of materials as sulfite lignins or sulfite lignosulfonates.

One lignosulfonate found useful in compositions and methods of the invention is the lignosulfonate sodium salt known under the trade designation Daxad 23, available from W.R. Grace Co., which is actually a combination of sodium salts of polymerized alkyl naphthalenic sulfonic acids with substituted benzoid alkyl sulfonic acids. Other useful lignosulfonates are listed herein in the paragraphs that follow with their CAS numbers, as well as their sulfonic acid parent molecule (which itself may be useful in certain compositions within the invention).

Lignosulfonic acid (CAS No. 8062-15-5)

Lignosulfonic acid, ammonium calcium salt (CAS No. 12710-04-2)

Lignosulfonic acid, ammonium magnesium salt (CAS No. 123175-37-1)

Lignosulfonic acid, ammonium salt (CAS No. 8061-53-8)

Lignosulfonic acid, ammonium sodium salt (CAS No. 166798-73-8)

Lignosulfonic acid, calcium magnesium salt (CAS No. 55598-86-2)

Lignosulfonic acid, calcium salt (CAS No. 8061-52-7)

Lignosulfonic acid, calcium sodium salt (CAS No. 37325-33-0)

Lignosulfonic acid, ethoxylated, sodium salt (CAS No. 68611-14-3)

Lignosulfonic acid, magnesium salt (CAS No. 8061-54-9)

Lignosulfonic acid, potassium salt (CAS No. 37314-65-1)

Lignosulfonic acid, sodium salt (CAS No. 8061-51-6)

Lignosulfonic acid, sodium salt, oxidized (CAS No. 68855-41-4)

Lignosulfonic acid, sodium salt, polymer with HCHO and phenol (CAS No. 37207-89-9)

Lignosulfonic acid, sodium salt, sulfomethylated (CAS No. 68512-34-5)

Lignosulfonic acid, zinc salt (CAS No. 57866-49-6).

Exemplary cationic viscoelastic surfactants useful in the compositions and methods of the invention include the amine salts and quaternary amine salts disclosed in U.S. Pat. Nos. 5,979,557, and 6,435,277 which have a common Assignee as the present application and which are hereby incorporated by reference.

Examples of suitable cationic viscoelastic surfactants include cationic surfactants having the structure:

in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Cationic surfactants having the structure $R_1N^+(R_2)(R_3)(R_4)X^-$ may optionally contain amines having the structure $R_1N(R_2)(R_3)$. It is well known that commercially available cationic quaternary amine surfactants often contain the corresponding amines (in which $R_1$, $R_2$, and $R_3$ in the cationic surfactant and in the amine have the same structure). As-received commercially available VES surfactant concentrate formulations, for example cationic VES surfactant formulations, may also optionally contain one or more members selected from alcohols, glycols, organic salts, chelating agents, solvents, mutual solvents, organic acids, organic acid salts, inorganic salts, oligomers, polymers, co-polymers, and mixtures of these members. They may also contain performance enhancers, such as viscosity enhancers, for example polysulfonates, for example polysulfonic acids, as described in copending U.S. Patent Application Publication No. 2003-0134751 which has a common Assignee as the present application and which is hereby incorporated by reference.

Another suitable cationic VES is erucyl bis(2-hydroxyethyl)methyl ammonium chloride, also known as (Z)-13 docosenyl-N—N— bis(2-hydroxyethyl)methyl ammonium chloride. It is commonly obtained from manufacturers as a mixture containing about 60 weight percent surfactant in a mixture of isopropanol, ethylene glycol, and water. Other suitable amine salts and quaternary amine salts include (either alone or in combination in accordance with the invention), erucyl trimethyl ammonium chloride; N-methyl-N,N-bis(2-hydroxyethyl)rapeseed ammonium chloride; oleyl methyl bis(hydroxyethyl) ammonium chloride; erucylamidopropyltrimethylamine chloride, octadecyl methyl bis(hydroxyethyl)ammonium bromide; octadecyl tris(hydroxyethyl)ammonium bromide; octadecyl dimethyl hydroxyethyl ammonium bromide; cetyl dimethyl hydroxyethyl ammonium bromide; cetyl methyl bis(hydroxyethyl)ammonium salicylate; cetyl methyl bis(hydroxyethyl)ammonium 3,4,-dichlorobenzoate; cetyl tris(hydroxyethyl)ammonium iodide; cosyl dimethyl hydroxyethyl ammonium bromide; cosyl methyl bis(hydroxyethyl) ammonium chloride; cosyl tris(hydroxyethyl)ammonium bromide; dicosyl dimethyl hydroxyethyl ammonium bromide; dicosyl methyl bis(hydroxyethyl) ammonium chloride; dicosyl tris(hydroxyethyl) ammonium bromide; hexadecyl ethyl bis(hydroxyethyl) ammonium chloride; hexadecyl isopropyl bis(hydroxyethyl) ammonium iodide; and cetylamino, N-octadecyl pyridinium chloride.

Many fluids made with viscoelastic surfactant systems, for example those containing cationic surfactants having structures similar to that of erucyl bis(2-hydroxyethyl)methyl ammonium chloride, inherently have short re-heal times and the inventive rheology enhancers useful in the present invention may not be needed except under special circumstances, for example at very low temperatures.

VES fluid systems within the invention may comprise a zwitterionic surfactant. One suitable class of zwitterionic surfactants has the formula:

in which R is an alkyl group that contains from about 17 to about 23 carbon atoms which may be branched or straight chained and which may be saturated or unsaturated; a, b, a', and b' are independently selected from integers ranging from 0 to about 10, m and m' are independently selected from integers ranging from 0 to about 13, a and b are each 1 or 2 if m is not 0 and (a+b) is from about 2 to about 10 if m is 0; a' and b' are each 1 or 2 when m' is not 0 and (a'+b') is from 1 to 5 if m' is 0; (m+m') ranges from 0 to about 14; and $CH_2CH_2O$ may also be $OCH_2CH_2$.

In certain embodiments of the invention, zwitterionic surfactants include betaines. Two suitable examples of betaines are BET-O and BET-E. The surfactant in BET-O-30 is shown below; one chemical name is oleylamidopropyl betaine. It is designated BET-O-30 because as obtained from the supplier (Rhodia, Inc. Cranbury, N.J., U.S. A.) it is called Miratraine BET-O-30 because it contains an oleyl acid amide group (including a $C_{17}H_{33}$ alkene tail group) and contains about 30% active surfactant; the remainder is substantially water, sodium chloride, and propylene glycol. An analogous material, BET-E-40, is also available from Rhodia and contains an erucic acid amide group (including a $C_{21}H_{41}$ alkene tail group) and is approximately 40% active ingredient, with the remainder being substantially water, sodium chloride, and isopropanol. VES systems of the invention, in particular VES systems comprising BET-E-40, optionally contain about 1% of a condensation product of a non-aromatic sulfonic acid, for example sodium polynaphthalene sulfonate, as a rheology modifier, as described in U.S. Patent Application Publication No. 2003-0134751, incorporated herein by reference. Surfactant containing this additive may need less of the additive of the present invention. The surfactant in BET-E-40 is also shown below; one chemical name is erucylamidopropyl betaine. BET surfactants, and other VES's (minus the inventive rheology enhancer) that are suitable for use in the compositions and methods of the present invention, are described in U.S. Pat. No. 6,258,859, incorporated herein by reference. According to the '859 patent, BET surfactants make viscoelastic gels when in the presence of certain organic acids, organic acid salts, or inorganic salts; in that patent, the inorganic salts were present at a weight concentration up to about 30%. Co-surfactants may be useful in extending the brine tolerance, and to increase the gel strength and to reduce the shear sensitivity of the VES fluid compositions of the invention, in particular those inventive compositions comprising BET-O-type surfactants. An example given in U.S. Pat. No. 6,258,859 is sodium dodecylbenzene sulfonate (SDBS), also shown below. Other suitable co-surfactants include, for example those having the SDBS-like structure in which x ranges from about 5 to about 15; a sub-set of suitable co-surfactants are those in which x ranges from about 7 to about 15. Still other suitable co-surfactants for BET-O-30 are certain chelating agents such as trisodium hydroxyethylethylenediamine triacetate. The rheology enhancers of the present invention may be used with viscoelastic surfactant fluid systems that contain such additives as co-surfactants, organic acids, organic acid salts, and/or inorganic salts.

Surfactant in BET-O-30 (when n=3 and p=1)

Surfactant in BET-E-40 (when n=3 and p=1)

SDBS (when x=11 and the counterion is Na$^+$)

Certain embodiments of the present invention use betaines, for example BET-E-40. Although experiments have not been performed, it is believed that mixtures of betaines, especially BET-E-40, with other surfactants are also suitable. Such mixtures are within the scope of embodiments of the invention.

Other betaines that are suitable include those in which the alkene side chain (tail group) contains 17-23 carbon atoms (not counting the carbonyl carbon atom) which may be branched or straight chained and which may be saturated or unsaturated, n=2-10, and p=1-5, and mixtures of these compounds. Exemplary betaines for use in the invention are those in which the alkene side chain contains 17-21 carbon atoms (not counting the carbonyl carbon atom) which may be branched or straight chained and which may be saturated or unsaturated, n=3-5, and p=1-3, and mixtures of these compounds. The surfactants are used at a concentration of about 0.5 to about 10%, preferably from about 1 to about 5%, and most preferably from about 1.5 to about 4.5%.

Amphoteric viscoelastic surfactants may also be used. Suitable amphoteric viscoelastic surfactants include those described in U.S. Pat. No. 6,703,352, for example amine oxides. Amidoamine oxide surfactants may be suitable. Mixtures of zwitterionic surfactants and amphoteric surfactants may suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide.

Viscoelastic surfactant fluids, for example those used in the oilfield, may also contain agents that dissolve minerals and compounds, for example in formations, such as scale, and filtercakes. Such agents may be, for example, hydrochloric acid, formic acid, acetic acid, lactic acid, glycolic acid, sulfamic acid, malic acid, citric acid, tartaric acid, maleic acid, methylsulfamic acid, chloroacetic acid, aminopolycarboxylic acids, 3-hydroxypropionic acid, polyaminopolycarboxylic acids, for example trisodium hydroxyethylethylenediamine triacetate, and salts of these acids and mixtures of these acids and/or salts. For sandstone treatment, the fluid also typically contains a hydrogen fluoride source. The hydrogen fluoride source may be HF itself or may be selected from ammonium fluoride and/or ammonium bifluoride or mixtures of the two; when strong acid is present the HF source may also be one or more of polyvinylammonium fluoride, polyvinylpyridinium fluoride, pyridinium fluoride, imidazolium fluoride, sodium tetrafluoroborate, ammonium tetrafluoroborate, salts of hexafluoroantimony, TEFLON™ synthetic resinous fluorine-containing polymer, and mixtures. When the formation-dissolving agent is a strong acid, the fluid preferably contains a corrosion inhibitor. The fluid optionally contains chelating agents for polyvalent cations, for example especially aluminum, calcium and iron (in which case the agents are often called iron sequestering agents) to prevent their precipitation. Some of the formation-dissolving agents just described are chelating agents as well. Chelating agents may be added at a concentration, for example, of about 0.5% (of active ingredient). When VES fluids contain strong acids, they are typically not gelled and display low viscosity; when the pH increases as the acid reacts with the mineral, the system gels and the viscosity increases. Such fluids may be called viscoelastic diverting acids, or VDA®'s (VDA® is a registered trademark of Schlumberger Technology Corporation). The rheology enhancers of the present invention may be used in viscoelastic surfactant fluid systems containing acids and chelating agents.

Prior art rheology enhancers, such as partially hydrolyzed polyvinyl esters and partially hydrolyzed polyacrylates, may be used in combination with high molecular weight aromatic sulfonate rheology enhancers, or applied sequentially in separate compositions, in certain method embodiments. From a technical point of view, it is not necessary to combine two rheology enhancers to obtain improved performance in shear recovery. In certain combinations, it has been found that by combining two enhancers in some extreme concentrations, one enhancer may make the fluid not recover shear, but improves the rheology at mid-temperature range, while the other enhancer is used as a shear recovery agent. Embodiments wherein a rheology enhancer of the invention is combined with a prior art rheology enhancer may not be as practical to use as the rheology enhancers of the invention used alone, but such embodiment are considered within the invention, as long as the intended effect of the high molecular weight aromatic sulfonate rheology enhancer is not substantially adversely affected. Useful partially hydrolyzed polyvinyl esters and partially hydrolyzed polyacrylates may have a percent hydrolysis between about 10% and about 95%, and molecular weight ranging from about 500 to about 100,000,000. Other esters may be used, for example $C_2$ to $C_5$ esters (i.e. the partially hydrolyzed ethyl to pentyl esters of polyvinyl alcohol). As another example, the partially hydrolyzed polyvinyl acetate may have a percent hydrolysis between about 30% and about 88%, and molecular weight, for example, from about 500 to about 1,000,000,000. These other rheology enhancers may also be chosen from partially hydrolyzed polyacrylates, or partially hydrolyzed polymethacrylates or the like, for example, but not limited to, partially hydrolyzed polymethyl acrylate, partially hydrolyzed polyethyl acrylate, partially hydrolyzed polybutyl acrylate, partially hydrolyzed polymethyl methacrylate, and mixtures of these polymers.

Other suitable prior art rheology enhancers which may be used in conjunction with high molecular weight aromatic sulfonates of the invention include amphiphilic polymers (having some polar groups on an otherwise water-insoluble backbone so that the polymer is soluble in both water and organic solvents and has an affinity to both polar and non-polar solvents) for example partially hydrolyzed polyvinyl acetate (PHPVA) having the composition:

typically abbreviated as in the first structure shown, with [m/(n+m)]100=% hydrolysis, although actually having the hydrolyzed sites randomly distributed, as shown in the second structure. (This material is also sometimes known as partially hydrolyzed polyvinyl alcohol or as polyvinyl alcohol/polyvinyl acetate copolymer.) An example is obtained from Synthomer Limited, Harlow, Essex, United Kingdom, under the trade name Alcotex WD200. This material is an aqueous solution containing approximately 20% of an approximately 43% hydrolyzed polyvinyl acetate having an average molecular weight of about 25,000. For shortening of shear recovery time, suitable partially hydrolyzed polyvinyl acetate (PHPVA) may be from about 10% to about 95% hydrolyzed and have a molecular weight of from about 500 to about 100,000,000. For increasing fluid system rheology, suitable PHPVA is from about 30% to about 88% hydrolyzed and has a molecular weight of from about 5000 to about 1,000,000,000. Other esters of polyvinyl alcohol may be used, for example $C_2$ to $C_5$ esters (i.e. the partially hydrolyzed ethyl to pentyl esters of polyvinyl alcohol). These materials were described in U.S. Patent Application Publication No. 2006-0128598, assigned to the same assignee as the present invention, and hereby incorporated in its entirety.

Other suitable amphiphilic polymers include partially hydrolyzed polyacrylates, or partially hydrolyzed polymethacrylates or the like, for example, but not limited to, partially hydrolyzed polymethyl acrylate, partially hydrolyzed polyethyl acrylate, partially hydrolyzed polybutyl acrylate, partially hydrolyzed polymethyl methacrylate, and mixtures of these polymers.

Preparation and use (mixing, storing, pumping, etc.) of the improved VES fluid systems of the invention are the same as for such fluids without the rheology enhancers. For example, the order of mixing is not affected by including high molecular weight aromatic sulfonate rheology enhancers. Optionally, the high molecular weight aromatic sulfonate rheology enhancers may be incorporated in surfactant concentrates (provided that they do not affect component solubilities or concentrate freezing points) so that the concentrates can be diluted with an aqueous fluid to make VES fluid systems of the invention. This maintains the operational simplicity of the inventive VES fluid systems. As is normally the case in fluid formulation, laboratory tests should be run to ensure that the additives do not affect, and are not affected by, other components in the fluid (such as salts, for example). In particular, the rheology enhancers of the present invention may be used with other rheology modifiers. Adjusting the concentrations of surfactant, rheology enhancer, and other fluid components to account for the effects of other components is within the scope of the invention.

The VES fluid systems of the invention may be used, for example in oilfield treatments. As examples, VES fluid systems of the invention may be used as a pad fluid and/or as a carrier fluid and/or as a diverter in hydraulic fracturing, as a carrier fluid for lost circulation control agents, as a carrier fluid for gravel packing, and as a diverter or a main fluid in acidizing and acid fracturing. The fluids may also be used in other industries, such as pharmaceuticals, cosmetics, printing, and agriculture.

The optimal concentration of a given high molecular weight aromatic sulfonate rheology enhancing additive for a given choice of VES surfactant fluid system at a given concentration and temperature, and with given other materials present, can be determined by simple experiments. The total viscoelastic surfactant concentration must be sufficient to form a viscoelastic gel under conditions at which the surfactants have sufficient aggregation tendency. The appropriate amounts of surfactant and rheology enhancer are those necessary to achieve the desired viscosity and shear recovery time as determined by experiment. Again, tolerance for, and optimal amounts of other additives may also be determined by simple experiment. In general, the amount of surfactant (as active ingredient) is from about 1 to about 10%. Commercially available surfactant concentrates may contain some materials that are themselves rheology enhancers, although they may be present for example for concentrate freezing point depression, so the amount of surfactant and rheology enhancer used is determined for the specific concentrate used. Mixtures of surfactants and/or mixtures of rheology enhancers (including mixtures of more than one rheology enhancer of the invention, and mixtures of one or more rheology enhancers of the invention with one or more other rheology enhancers) may be used. Mixtures of surfactants may include surfactants that are not viscoelastic surfactants when not part of a viscoelastic surfactant system. All mixtures are tested and optimized; for example, too much total rheology enhancer may decrease the beneficial effects.

EXPERIMENTAL

The present invention can be further understood from the following examples. In the examples, Cat A was a blend of cationic and non-ionic surfactant formulation containing the cationic surfactant $R_1N^+(R_2)(R_3)(R_4)X^-$ (in which $R_1$ has from about 18 to about 22 carbon atoms and contains an amide; $R_2$, $R_3$, and $R_4$ are the same short-chained saturated alkyl group, and $X^-$ is a halide). The Cat A surfactant formulation contained the types and amounts of additives commonly found in commercially available as-received surfactant concentrates. Cat B was a blend of surfactants having cationic properties and exhibited some salt tolerance. Cat C was a formulation of the zwitterionic surfactant concentrate BET-E-40, containing erucylamidopropyl betaine.

The concentrations given for the surfactants are weight % of the as-received concentrates. All samples contained 4% KCl.

Example 1

The lignosulfonate known under the trade designation Daxad 23, available from W.R. Grace Co., was added as a rheology enhancer to the three different surfactants Cat A, Cat B, and Cat C as described above to test the improvement in their fluid shear recovery. As evidenced in Table 1, the aromatic sulfonate showed a pronounced effect on fluid shear recovery at low additive concentration. Addition of this aromatic sulfonate to several different VES systems significantly shortened the shear recovery time at low VES loadings.

Comparative Example

The naphthalenic sulfonate known under the trade designation Daxad 19, also available from W.R. Grace Co., was similarly tested in with the Cat A formulation. Results are listed in Table 2.

In these experiments, approximately 200 mL of already-mixed VES fluid was sheared at no less than 10,000 rpm for no less than 30 seconds and no more than 1 minute in a 1 L Waring blender. The shearing was stopped and timing was begun. The fluid was poured back and forth between a beaker and the blender cup and the fluid recovery was characterized by two times, referred to as the initial and final recovery times; both were estimated by visual observation. The initial fluid recovery time was the time at which fluid "balling" occurred (when the fluid showed the first signs of elasticity as indicated by the fluid taking a longer time to achieve a flat surface in the receiving beaker when poured). The final fluid recovery time was the time at which fluid "lipping" occurred. The fluid "lips" when inclining the upper beaker or cup containing the fluid does not result in fluid flow into the container below, but rather the formation of a "lip", and pulling the container back to a vertical position pulls back the "lip". In fracturing fluid practice, "lipping" is used to estimate when the fluid reaches its near-equilibrium elasticity. Tables 1 and 2 show the final fluid recovery times for several systems and shows that the lignosulfonate known under the trade designation Daxad 23 reduced the shear recovery times of three different surfactant systems from over five minutes to 6 seconds or to too short to measure, whereas the naphthalenic sulfonate known under the trade designation Daxad 19 showed little reduction in shear recovery time of one cationic surfactant system.

TABLE 1

| Surfactant System | Concentration (%) | Aromatic sulfonate concentration (ppt) | Shear Recovery Time (sec) |
|---|---|---|---|
| Cat A | 1 | 0 | >300 |
| Cat A | 2 | 0 | 19 |
| Cat A | 3 | 0 | 0 |
| Cat A | 1 | 0.8 | 0 |
| Cat A | 2 | 1.6 | 0 |
| Cat A | 3 | 2.4 | 0 |
| Cat B | 1.50 | 0 | >300 |
| Cat B | 1.50 | 1 | 0 |
| Cat C | 1.50 | 0 | >300 |
| Cat C | 1.50 | 1 | 9 |

TABLE 2

| Surfactant System | Concentration (%) | Naphthalenic sulfonate concentration (ppt) | Shear Recovery Time (sec) |
|---|---|---|---|
| Cat A | 1 | 1.6 | 9 |
| Cat A | 2 | 0 | 19 |
| Cat A | 2.5 | 0 | 0 |
| Cat A | 3 | 0 | 0 |

Figure 1:
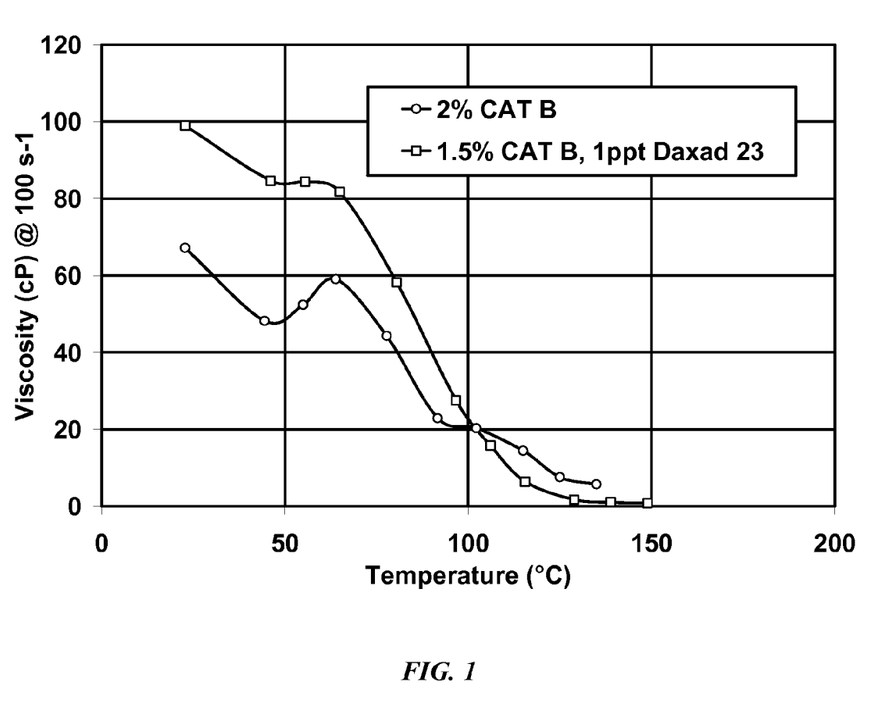
FIG. 1 illustrates viscosity as a function of temperature for two different concentrations of a known viscoelastic surfactant, the lower concentration having added thereto an amount of a high molecular weight aromatic sulfonate rheology enhancer.

The lignosulfonate known under the trade designation Daxad 23 also had a noticeable positive impact on fluid rheology. As illustrated in FIG. 1, comparing the Cat A surfactant formulation with and without the lignosulfonate, it is apparent that there was some viscosity improvement at mid temperatures by adding this lignosulfonate.

Example 2

Figure 2:
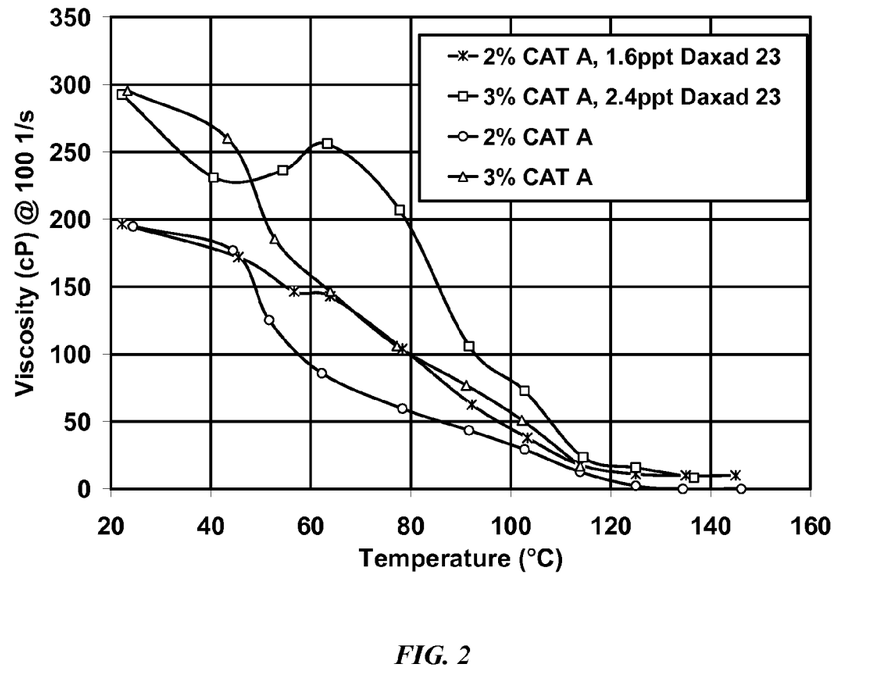
FIG. 2 illustrates results from experiments similar to those illustrated in FIG. 1, except using a different batch of the viscoelastic surfactant.

Illustrated in FIG. 2 are results from experiments identical to those described in Example 1, except using a different lot (batch) of the Cat A surfactant formulation. This lot behaved somewhat differently from the first lot (perhaps due to a different degree of quaternization, or different ratios of main and co-surfactants) but it was noted that the added lignosulfonate still gave improved viscosities compared to the same surfactant fluid without the lignosulfonate.

Exampe 3

Figure 3:
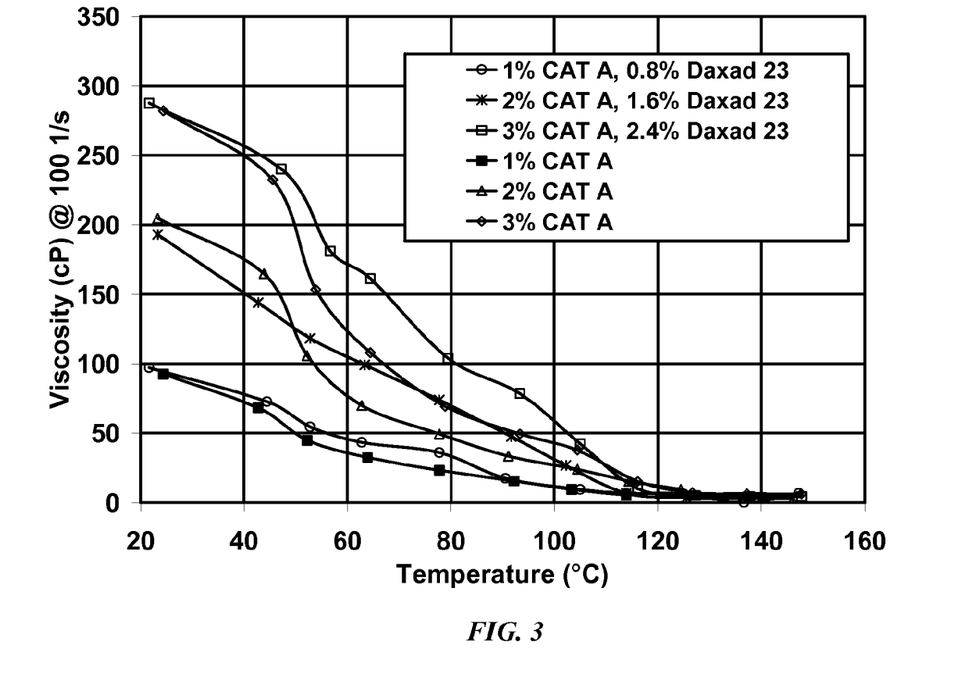
FIG. 3 illustrates viscosity as a function of temperature for another known viscoelastic surfactant with and without a high molecular weight aromatic sulfonate rheology enhancer of the invention.

Viscosity improvement with the lignosulfonate known as Daxad 23 was also shown in other VES fluid systems. Illustrated in FIG. 3 is the effect of Daxad 23 on the Cat B surfactant formulation. It is seen that with the lignosulfonate Daxad 23, 1.5% of the Cat B fluid performed even better than 2% of the Cat B formulation without Daxad 23.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method comprising:
   (a) providing a viscoelastic surfactant fluid system comprising a major portion of a surfactant selected from cationic, anionic, zwitterionic, and amphoteric viscoelastic surfactants, and mixtures thereof, and a rheology enhancer in a concentration of from about 0.0005 weight % to about 0.05 weight %, said concentration sufficient to shorten shear recovery time of the fluid system compared to shear recovery time of the fluid system absent the rheology enhancer, the rheology enhancer selected from aromatic sulfonates having a molecular weight of at least 500 and comprising one or more water-soluble lignosulfonates derived from wood pulping; and
   (b) injecting the fluid system down a well.

2. The method of claim 1 wherein the rheology enhancer increases the viscosity of the fluid.

3. The method of claim 1 wherein the rheology enhancer has a molecular weight ranging from about 500 to about 100,000.

4. The method of claim 1 wherein the cationic surfactant is selected from cationic surfactants or mixture of surfactants having the structure:

in which $R_1$ comprises from about 14 to about 26 carbon atoms and may be branched or straight chained, aromatic, saturated or unsaturated, and may comprise a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which is optionally substituted with a group that renders the $R_2$, $R_3$, and $R_4$ group more hydrophilic; the $R_2$, $R_3$ and $R_4$ groups are optionally incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion; and mixtures of these compounds.

5. The method of claim 4 wherein $R_1$ comprises from about 18 to about 22 carbon atoms and optionally comprises a moiety selected from a carbonyl, an amide, or an amine; $R_2$, $R_3$, and $R_4$ each comprise from 1 to about 3 carbon atoms, and $X^-$ is a halide.

6. The method of claim 4 wherein $R_1$ comprises from about 18 to about 22 carbon atoms and optionally comprises a moiety selected from a carbonyl, an amide, or an amine, and $R_2$, $R_3$, and $R_4$ are the same as one another and comprise from 1 to about 3 carbon atoms.

7. The method of claim 1 wherein the fluid system comprises a zwitterionic surfactant.

8. The method of claim 7 wherein the zwitterionic surfactant comprises a surfactant or mixture of surfactants having the formula:

in which R is an alkyl group comprising from about 17 to about 23 carbon atoms which may be branched or straight chained and which may be saturated or unsaturated; a, b, a', and b' are independently selected from integers ranging from 0 to about 10, m and m' are independently selected from integers ranging from 0 to about 13, a and b are each 1 or 2 if m is not 0 and (a+b) is from about 2 to about 10 if m is 0; a' and b' are each 1 or 2 when m' is not 0 and (a'+b') is from 1 to 5 if m' is 0; (m+m') ranges from 0 to about 14; and $CH_2CH_2O$ may also be $OCH_2CH_2$.

9. The method of claim 7 wherein the zwitterionic surfactant has the betaine structure:

wherein R is a hydrocarbyl group that may be branched or straight chained, aromatic, aliphatic or olefinic and has from about 14 to about 26 carbon atoms and may contain an amine; n ranges from about 2 to about 4; and p ranges from 1 to about 5, and mixtures of these compounds.

10. The method of claim 9 wherein the betaine is oleylamidopropyl betaine or erucylamidopropyl betaine.

11. The method of claim 9 wherein the fluid comprises a co-surfactant.

12. The method of claim 1 wherein the fluid further comprises a member selected from the group consisting of amines, alcohols, glycols, organic salts, chelating agents, solvents, mutual solvents, organic acids, organic acid salts, inorganic salts, oligomers, polymers, co-polymers, and mixtures of said members.

13. The method of claim 12 wherein the member is present at a concentration of between about 0.01 and about 10 percent.

14. The method of claim 13 wherein the member is present at a concentration of between about 0.01 and about 1 percent.

15. The method of claim 1 wherein the fluid comprises an amphoteric surfactant.

16. The method of claim 1 wherein the well is selected from cased, cased and cemented, and open hole wellbores.

17. The method of claim 1 wherein the fluid further comprises an acid selected from the group consisting of hydrochloric acid, hydrofluoric acid, formic acid, acetic acid, lactic acid, glycolic acid, sulfamic acid, malic acid, citric acid, tartaric acid, maleic acid, methylsulfamic acid, chloroacetic acid, and mixtures thereof.

* * * * *